No. 647,091. Patented Apr. 10, 1900.
H. N. HANSEN.
SPADE.
(Application filed Dec. 22, 1899.)
(No Model.)

WITNESSES:
Albert Popkins
H. Joseph Doyle

INVENTOR
Hans N. Hansen,
BY
W. A. Ruff
ATTORNEY

UNITED STATES PATENT OFFICE.

HANS N. HANSEN, OF HUMBOLDT, IOWA.

SPADE.

SPECIFICATION forming part of Letters Patent No. 647,091, dated April 10, 1900.

Application filed December 22, 1899. Serial No. 741,310. (No model.)

*To all whom it may concern:*

Be it known that I, HANS N. HANSEN, a citizen of the United States, residing at Humboldt, in the county of Humboldt and State of Iowa, have invented certain new and useful Improvements in Spades, of which the following is a specification.

This invention relates to spades, and especially to spades designed for working in moist earth, such as digging ditches and the like, and has for its object to provide a spade to which the damp or moist earth will not stick or adhere; and to this end my invention consists in the features and in the construction, combination, and arrangement of parts hereinafter described, and particularly pointed out in the claims following the description, reference being had to the accompanying drawings, forming a part of this invention, wherein—

Figure 1:
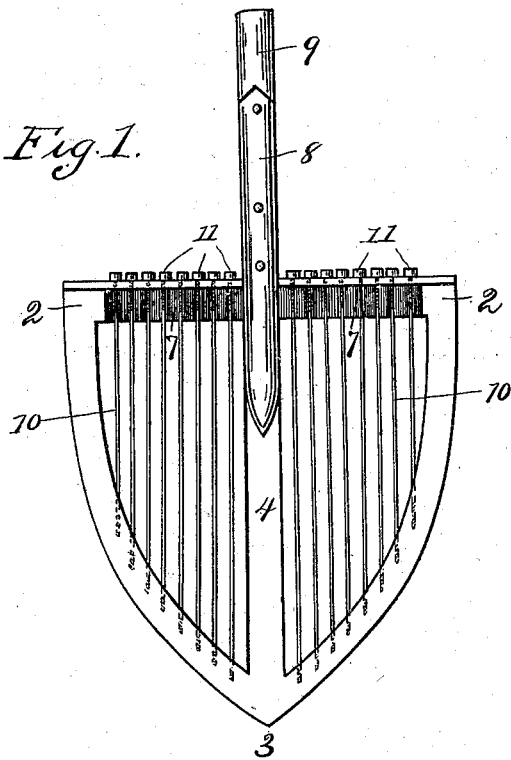
Figure 2:
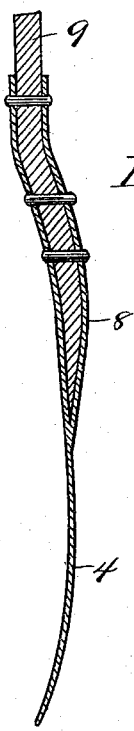
Figure 3:
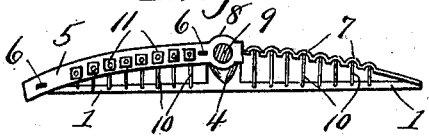

Figure 1 is a front elevation of my improved spade. Fig. 2 is a vertical central sectional view thereof; and Fig. 3 is a top plan view, the upper portion being broken away at one side.

Referring to the drawings, the spade is shown as comprising a frame consisting of the edge and bottom portions 1 and the top portions 2, the point 3 of the spade and the top portion 2 being united by a central stay or brace 4, formed integrally with said frame. Disposed upon the upper edge of the spade is a plate 5, which may be secured to the frame by tongues 6, which are projected through suitable openings in the plate and are upset or riveted down upon the plate, or the plate 5 may be formed integral with the upper portion 2 of the frame and bent or flanged over at a right angle thereto. The upper portion 2 of the frame is transversely corrugated, as shown at 7, Fig. 3, for the purpose hereinafter explained, and the central stay 4 is provided with the usual socket 8 for the reception of the handle 9.

The numeral 10 indicates polished-steel rods threaded at their opposite ends, the lower ends of said rods being screwed into threaded sockets formed in edges 1 of the frame, and the upper ends of said rods pass through perforations in the plate 5, and nuts 11 are screwed over their upper threaded ends and against the plate 5, whereby said rods are strained and stretched tight. The upper ends of the rods lie in the grooves formed by the corrugations 7, said corrugations forming seats for the rods and serving to center the latter and also add stiffness to the spade.

As before stated, the rods are of polished steel, to which the soil will not stick or adhere and from which it will readily slip off as the spade is swung to throw aside the earth.

Having described my invention, what I claim is—

1. A spade comprising a frame centrally apertured between its edges, a plurality of parallel rods extending from the top to the bottom of the frame, and means for stretching or straining said rods, substantially as described.

2. A spade comprising the frame 1 2, the plate 5 on the upper edge of the frame, the rods 10 screwed at their lower ends into said frame and passing through the plate 5 at their upper ends, and nuts screwed over the upper ends of said rods, substantially as described.

3. A spade comprising the frame 1 2, the upper portion 2 thereof being transversely corrugated, a plate 5 on the upper edge of said frame, the polished rods 10 screwed at their lower ends into said frame and at their upper ends lying in the grooves of the corrugated portion of the frame and extending through perforations in the plate 5, and nuts screwed over the upper ends of said rods, substantially as described.

4. A spade comprising frame 1 2, centrally apertured between its edges and provided with the central stay 4, and a plurality of vertical rods extending from the top to the bottom of the frame, substantially as described.

In testimony whereof I affix my signature in presence of two witnesses.

HANS N. HANSEN.

Witnesses:
 JOHN ANDERSON,
 RASMUS HANSEN.